United States Patent [19]

Takada

[11] 4,284,294
[45] Aug. 18, 1981

[54] PASSIVE VEHICLE PASSENGER RESTRAINT BELT SYSTEM

[76] Inventor: Juichiro Takada, 3-12-1, Shinmachi Setagayaku, Tokyo, Japan

[21] Appl. No.: 23,720

[22] Filed: Mar. 26, 1979

[30] Foreign Application Priority Data

Mar. 31, 1978 [JP] Japan .............................. 53-40981[U]

[51] Int. Cl.³ .......................................... B60R 21/10
[52] U.S. Cl. .................................. 280/803; 280/804; 297/469
[58] Field of Search ....................... 280/804, 803, 802; 297/469

[56] References Cited

U.S. PATENT DOCUMENTS

| 3,842,929 | 10/1974 | Wada | 280/804 |
| 3,882,955 | 5/1975 | Kaneko | 280/804 |
| 3,949,825 | 4/1976 | Kazaoka | 280/803 |

Primary Examiner—John P. Silverstrim
Attorney, Agent, or Firm—Brumbaugh, Graves, Donohue & Raymond

[57] ABSTRACT

A passive vehicle passenger restraint belt system includes a single continuous drive wire driven by the output of a mechanical motion amplifier to pull a shoulder belt transfer ring forwardly along a guide rail above the door and push a lap belt transfer ring upwardly along the door upon opening motion of the door.

5 Claims, 5 Drawing Figures

PASSIVE VEHICLE PASSENGER RESTRAINT BELT SYSTEM

FIELD OF THE INVENTION

This invention relates to a passive vehicle passenger restraint belt system in which a single drive moves both a shoulder belt and a lap belt from a passenger-restraining to a passenger-releasing position in response to opening of the vehicle door.

BACKGROUND OF THE INVENTION

Among various proposals for passive vehicle passenger safety restraints are belt systems consisting of a shoulder belt and lap belt, both of which are transferred by movable transfer rings between passenger-restraining and passenger-releasing configurations. For example, in some systems the shoulder belt leads from a point inboard of, below and behind the passenger to a shoulder belt transfer ring which moves along the roof above the door between a forward, releasing position near the front post and a rearward, restraining position near the center post (above, behind and outboard of the seat occupant). The lap belt extends from the inboard point to a transfer ring which moves along the door between a lower, restraining position near the lower rear corner of the door and an upper, releasing position located near the window ledge and somewhere along the length of the door (fore and aft). Many of those systems use entirely separate drive mechanisms for each transfer guide. The present applicant has previously proposed passive belt systems in which a single drive device imparts motion to each transfer ring via separate drive elements, such as wires or racked wires driven by a dual output of the drive device.

SUMMARY OF THE INVENTION

In accordance with the present invention, a passive vehicle passenger restraint belt system comprises a single continuous drive wire driven by the output of a mechanical motion amplifier to pull a shoulder belt transfer ring forwardly along a guide rail above a vehicle door and push a lap belt transfer ring upwardly along the door upon opening motion of the door. More specifically, the invention is an improvement in a restraint belt system which includes a mechanical motion amplifier mounted in the door of the vehicle and an input device, such as a linkage, connected between the vehicle body adjacent the front, hinge end of the door and the motion amplifier to transmit opening and closing motions of the door, relative to the vehicle body, to the motion amplifier. The shoulder belt guide rail is affixed to the vehicle roof generally above the door and extends between a point generally above and behind the adjacent vehicle seat and a point generally above and forward of the seat, preferably near or along the post at the front of the door. A shoulder belt transfer ring slides along the guide rail and moves a portion of the shoulder belt between a rearward, restraining position and a forward, releasing position. A lap belt guide rail affixed to the vehicle door slidably receives a lap belt transfer ring which moves a portion of a lap belt from a lower, restraining position near the lower rear corner of the door and an upper, releasing position near the window ledge. As described thus far, the belt system, in which the present invention is an improvement, is known generally in several specific forms.

In accordance with the invention, a single, continuous drive wire is coupled adjacent one end to the shoulder belt transfer ring, is coupled at an intermediate driven portion to the output of the motion amplifier, and is coupled adjacent the other end to the lap belt transfer ring, such that upon opening motion of the door the motion amplifier moves the drive wire in a direction to pull the shoulder belt transfer ring forwardly and push the lap belt transfer ring upwardly in the respective guide rails.

In a preferred embodiment, the drive wire is a racked wire, an intermediate, driven portion of which meshes with and is driven by an output gear of the motion amplifier. One part of the racked wire leads generally forwardly from the output gear and is guided upwardly within the vehicle body and is received in the shoulder belt guide rail. The remaining portion of the wire leads rearwardly from the output gear through the door to the lap belt guide rail. If the distance through which the shoulder belt transfer ring moves is greater than the distance through which the lap belt transfer ring moves between the respective restraining and releasing positions, the drive wire is coupled to the transfer belt couple ring by merely engaging it. Until after the door is part way opened, during an initial part of the opening motion of the door from a closed position, the end of the drive wire is disengaged and spaced apart from the lap belt transfer ring.

For a better understanding of the invention, reference may be made to the following description of exemplary embodiments, taken in conjunction with the figures of the accompanying three sheets of drawings.

DESCRIPTION OF THE EMBODIMENTS

Figure 1:
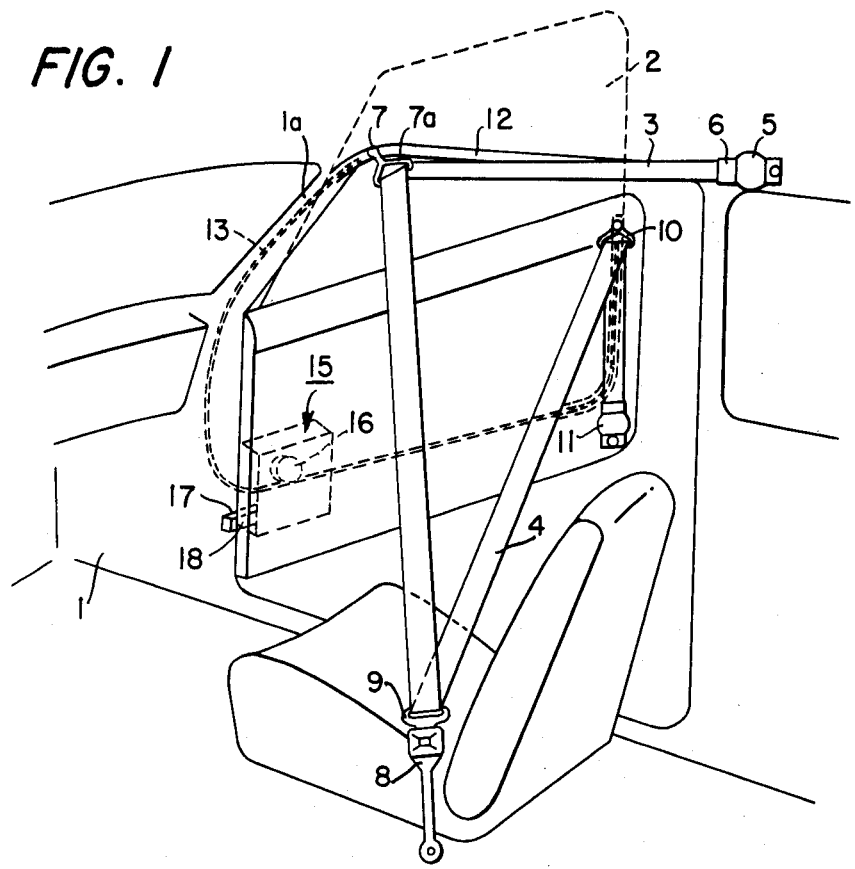
FIG. 1 is a schematic, pictorial view of one embodiment of the invention, the view showing the system in a releasing position with the door opened.
Figure 2:
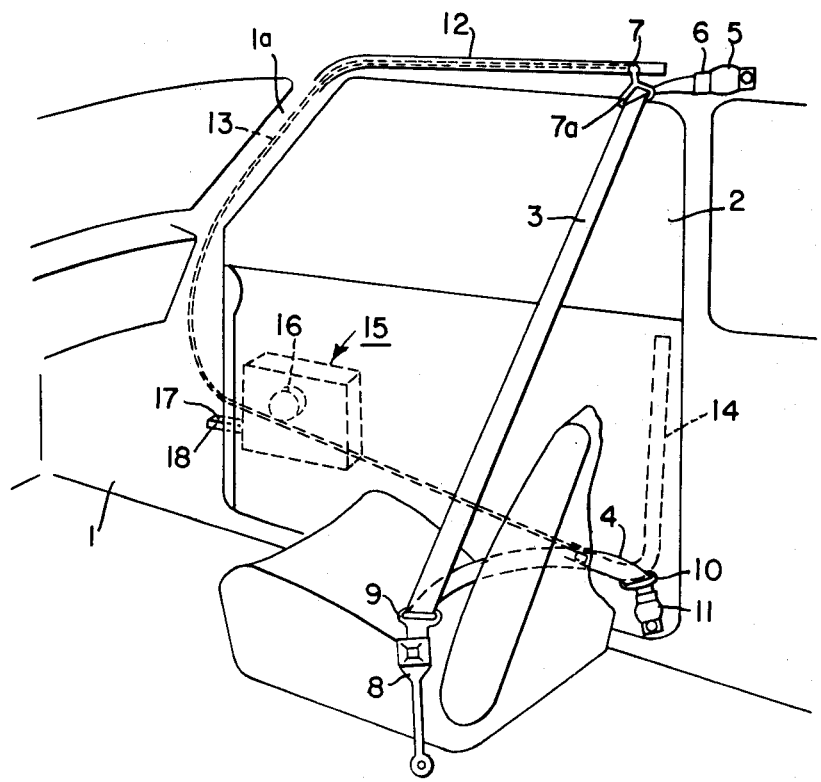
FIG. 2 is a schematic, pictorial view of the embodiment of FIG. 1 showing the belt system in the restraining position with the door closed.

The system shown in the drawings is intended for use on both the driver and passenger sides of a vehicle 1 and makes use of the opening and closing motions of the adjacent vehicle door 2 to transfer a shoulder belt portion 3 and a lap belt portion 4 of a continuous passenger restraint belt. The shoulder belt 3 leads from an emergency locking retractor 5 mounted above and behind the door 2 through a fixed guide ring 6 and a slot 7a in a movable transfer ring 7 to a buckle 8 affixed at the rear inboard side of the adjacent seat. The belt passes through a buckle tongue 9, at which point it becomes a lap belt, back across the seat, through a lap belt transfer ring 10 and into an emergency locking retractor 11 affixed to the door adjacent the lower rear corner. The shoulder belt transfer ring 7 slides along a guide rail 12 installed in the vehicle roof and extending above the door between a position close to the retractor 5 to a position near or along the front post 1a, along the windshield. One end of a racked wire 13 leads into the guide rail 12 and is fastened to the transfer ring 7. The racked wire 13 is suitably trained within the vehicle body to a point adjacent the front edge of the door and then turns rearwardly to enter the space between the inner and outer door panels where an intermediate portion meshes with and is driven by an output gear 16 of a mechanical motion amplifier 15. The racked wire 13 then leads rearwardly along the lower portion of the door and enters a lap belt guide rail 14, the lower portion of which curves from a generally horizontal orientation to a vertical orientation extending from a point close to the retractor 11 to an upper position near the window ledge.

Figure 3:
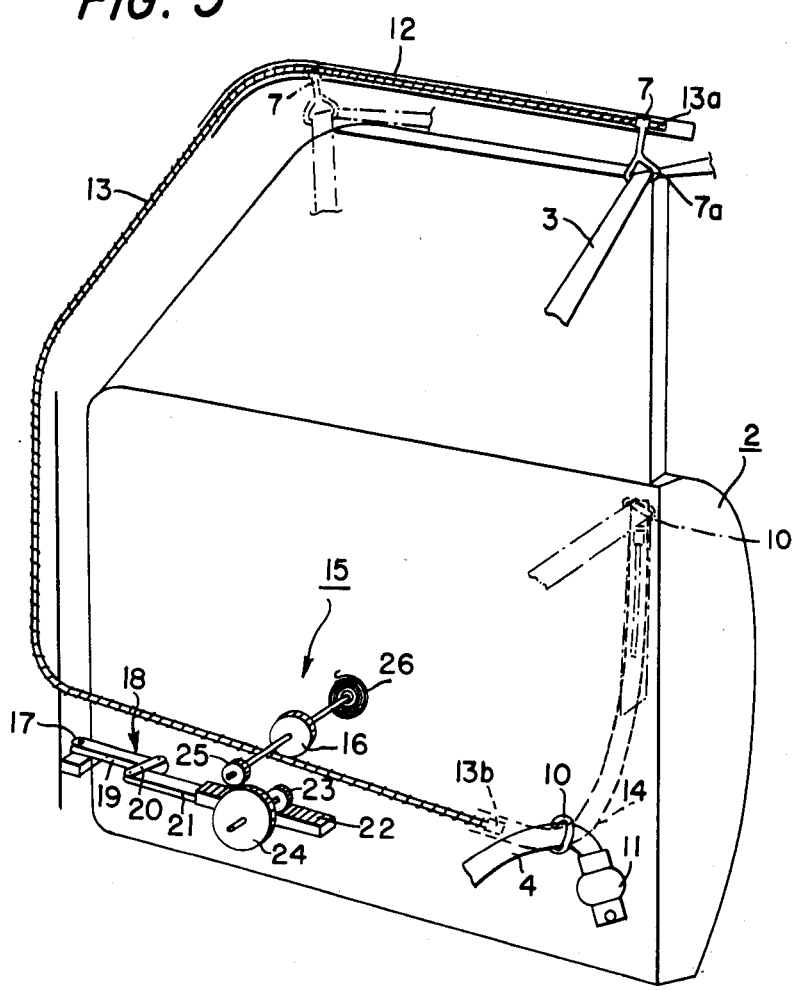
FIG. 3 is a pictorial view with additional detail of the embodiment of FIGS. 1 and 2.

Referring to FIG. 3, the mechanical motion amplifier comprises an input pinion 23, a relatively large gear 24 mounted on a common shaft with the input pinion, an intermediate pinion 25 which meshes with and is driven by the gear 24, and the output gear 16 which is in the same shaft as and rotates with the pinion 25. The input pinion 23 is driven by a rack gear 22 which is connected to the vehicle body by a linkage 18 joined to the vehicle body by a pivot pin 17. The specific linkage shown diagrammatically in FIG. 3 is a folding linkage and is described and shown in detail in U.S. Pat. Appln. Ser. No. 950,020 (filed Oct. 10, 1978, and entitled "Passive Vehicle Occupant Restraint Belt System") of common ownership. The linkage includes a first link 19 extending from the pivot pin 17 to an intermediate line 20 and a second line 21 having the rack gear 22 along one end. A guide member having slides or tracks (not shown) controls the linkage 18 such that during movement of the door between closed and partly open positions, preferably about half-way open, the linkage remains folded to transmit door motion to the input pinion. The motion amplifier magnifies the door motion, and the output gear 16 drives the racked wire 13. A coil spring 26 on the shaft of the output gear 16 and pinion 25 stores energy when the door is closed and delivers energy when the door is moved from closed to part-way open to assist in overcoming the forces on the belt applied by the retractors, thus reducing the force otherwise required to open the door. In the opening motion, the racked wire is driven in a direction to pull the shoulder belt transfer ring 7 forwardly along the guide rail 12 and push the lap belt transfer ring 10 upwardly along the guide rail 14.

Figure 4:
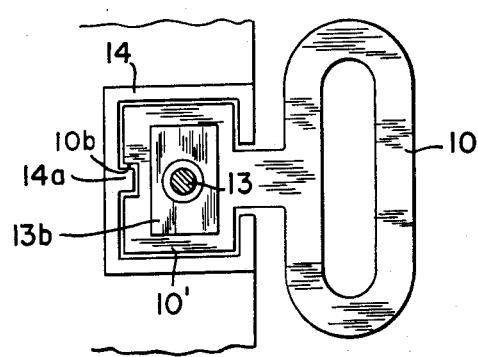
FIG. 4 is a fragmentary cross-sectional view taken through the drive wire looking toward the lower end of the lap belt guide rail.

The distance between the rearward, restraining position and the forward, releasing position of the shoulder belt transfer ring 7 is somewhat greater than the distance between the lower, restraining position and upper, releasing position of the lap belt transfer ring 10. Inasmuch as the end 13b of the racked wire 13 which drives the transfer ring 10 moves the same distance as the end 13a which moves the transfer ring 7, it is necessary to couple the transfer ring 10 to the racked wire for only a portion of the opening motion of the door which involves driving of the shoulder belt transfer ring 7. This is accomplished by coupling the end 13b of the racked wire to the transfer ring 10 merely by contact or engagement; the ring 10 is not fastened to the racked wire. As shown in FIG. 4, the end of the racked wire which drives the ring 10 has a fitting 13b fastened to it which contacts the slide portion 10' of the ring 10 after the racked wire moves a distance equal to the difference between the distances moved by the transfer ring 7 and the transfer ring 10 when the door is moved from closed toward the open position. To ensure free movement of the ring 10 in the guide rail 14, the rail has a rib 14a which is received in a matching slot 10b in the slide portion 10'.

In summary, movement of the shoulder belt transfer ring 7 commences as soon as the door starts to open from a closed position, and during the initial portion of the opening motion, the end 13b of the racked wire moves along the rail 14 without contacting or moving the lap belt transfer ring 10. When the difference in the distances through which the rings move between restraining and releasing positions has been taken up, the end fitting 13b contacts the ring 10, and for the remaining opening motion of the door to the part way opened position when the linkage 18 unfolds and ceases to drive the motion amplifier, the racked wire 13 pulls the shoulder belt transfer ring 7 forwardly and pushes the lap belt transfer ring upwardly. Further movement of the door from part way to fully opened occurs without any significant additional movement of the transfer rings.

When the door is reclosed, the racked wire 13 is driven in the opposite direction, thus to push the shoulder belt transfer ring 7 rearwardly and pull the fitting 13b downwardly in the guide rail 14. The retractor 11 applies a force to the lap belt 4 sufficient to pull the transfer ring 10 down along the rail 14 and rewound the belt. Similarly, the retractor 5 assists in pulling the ring and rewinds a length of the shoulder belt. When the door is fully closed, the lap and shoulder belts are properly fitted to the passenger in restraining confirurations.

Figure 5:
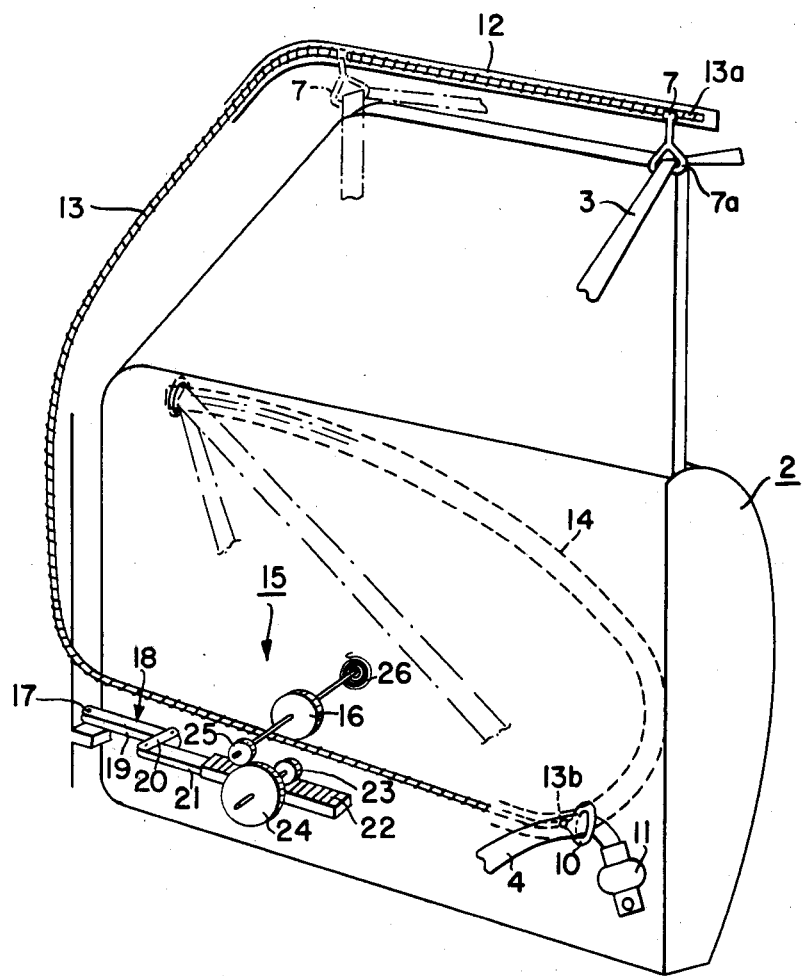
FIG. 5 is a schematic, pictorial view of a restraint belt system having a modified arrangement of the lap belt transfer guide.

The embodiment shown in FIG. 5 is the same as that shown in FIGS. 1 to 4 except for the arrangement of the lap belt transfer subsystem. The lap belt guide rail 14' curves upwardly and forwardly such that its upper end is located near the forward end of the door. The distance between the lower, restraining and the upward, releasing positions of the lap belt transfer ring 10 (solid lines in FIG. 5) measured along the guide rail is made equal to the distance along the rail between the rearward, restraining and the forward, releasing positions of the shoulder belt transfer ring 7. Accordingly, the lap belt transfer ring 10 is fastened to the end 13b' of the racked wire 13.

Thus, there is provided, in accordance with the present invention, a passive restraint belt system which provides highly effective passenger restraint by means of a lap belt and a shoulder belt and which provides for transfer of both belts to releasing positions in which entry to and departure from the vehicle by the passenger are greatly facilitated as compared to many known systems. The simultaneous movement of both belts by a single racked wire and a single motion amplifier provides a reliable system of relatively simple construction, which reduces manufacturing costs, and uses the driving force efficiently.

The above described embodiments of the invention are merely exemplary, and numerous variations and modifications can readily be made by those skilled in the art without departing from the spirit and scope of the invention. All such variations and modifications are intended to be included within the scope of the invention, as defined in the appended claims.

I claim:

1. A passive vehicle passenger restraint belt system comprising a mechanical motion amplifier mounted in the door of the vehicle; an input device connected between the vehicle body adjacent the front hinged end of the door and the motion amplifier to transmit the opening and closing motions of the door relative to the vehicle body to the motion amplifier; a shoulder belt guide rail affixed to the vehicle roof generally above the door and extending between a point generally above and behind the adjacent vehicle seat and a point generally above and forward of the seat; a shoulder belt transfer ring received in the shoulder belt guide rail for sliding movement between a rearward and a forward position therein; a shoulder belt having a portion received by the shoulder belt transfer ring for movement therewith; a lap belt guide rail affixed to the vehicle door and extending between a lower position near the lower rear corner of the door and an upper position near the window ledge; a lap belt transfer ring received in the lap belt guide rail for sliding movement between a lower position and an upper position therein; a lap belt having a portion received by the lap belt transfer ring for movement therewith; and a single continuous drive wire coupled adjacent one end to the shoulder belt transfer ring, coupled at an intermediate driven portion to an output of the motion amplifier to be driven thereby and coupled at the other end to the lap belt transfer ring such that upon opening motion of the door the motion amplifier moves the drive wire in a direction to pull the shoulder belt transfer ring forwardly and push the lap belt transfer ring upwardly in the respective guide rails.

2. The restraint belt system claimed in claim 1 wherein the drive wire is a racked wire which leads from the motion amplifier in generally opposite directions, one end leading to and into the shoulder belt guide rail and the other end to and into the lap belt guide rail, and wherein the output of the motion amplifier is a gear having teeth which mesh with the racks on the drive wire.

3. The restraint belt system claimed in claim 1 or claim 2 and further comprising belt retractor means for maintaining tension on the lap belt and wherein the drive wire is coupled to the lap belt transfer ring by engagement of the end without being fastened to it, thus to push it upwardly to the upper position upon opening motion of the door only after the door is opened part way, the end of the drive wire being disengaged and spaced apart from the lap belt transfer guide when the door is at or between the closed position and a partly opened position, and wherein the tension in the belt and gravity return the lap belt transfer ring to the lower position.

4. The restraint belt system claimed in claim 3 wherein the partly opened position of the door is that which corresponds to a movement of the drive wire equal to the difference between the transfer distances through which the lap and shoulder belt transfer rings move along the respective guide rails.

5. The restraint belt system according to claim 1 or 2 wherein the lap belt guide rail extends forwardly as well as upwardly along the door, the upper position of the lap belt transfer ring being closely adjacent the front end of the door, and wherein the lap belt transfer ring is fastened to the drive wire.

* * * * *